United States Patent [19]

Mitchell et al.

[11] Patent Number: 4,679,405

[45] Date of Patent: Jul. 14, 1987

[54] MOLDED DRAIN CONNECTION WITH INSERT

[75] Inventors: Charles A. Mitchell, Indianapolis, Ind.; Thaddeus J. Wawro, Auburn, N.Y.; Charles E. Whipple, Brewerton, N.Y.; William E. Wright, Sr., East Syracuse, N.Y.

[73] Assignee: Carrier Corporation, Syracuse, N.Y.

[21] Appl. No.: 881,991

[22] Filed: Jul. 3, 1986

[51] Int. Cl.$^4$ ............... F25D 21/14; F16L 33/00
[52] U.S. Cl. ................................ 62/285; 285/239; 285/397; 285/370
[58] Field of Search ............... 62/285; 285/236, 239, 285/397, 370

[56] References Cited

U.S. PATENT DOCUMENTS

| | | | |
|---|---|---|---|
| 1,562,954 | 11/1925 | Goodall | 285/239 |
| 3,678,993 | 7/1972 | Pierce | 62/285 X |
| 3,907,341 | 9/1975 | Schoepe | 285/236 |

Primary Examiner—Henry A. Bennet
Attorney, Agent, or Firm—Dana F. Bigelow

[57] ABSTRACT

An integrally threaded brass insert is molded into the discharge conduit of a condensate pan such that a steel drainage pipe can be threadably engaged to the insert without causing damage to the plastic discharge conduit. Bonding between the insert and the surrounding conduit is enhanced by providing a knurled surface on the outer periphery of the insert.

10 Claims, 3 Drawing Figures

MOLDED DRAIN CONNECTION WITH INSERT

BACKGROUND OF THE INVENTION

This invention relates generally to air conditioning systems and, more particularly, to a drain connection for condensate pans used with evaporator coils in air conditioning systems.

It is common in air conditioning systems to collect and dispose of accumulated condensation at the evaporator coil. This is normally accomplished with the use of a condensate pan or tray which is placed under the evaporator coil and then drained off through a discharge opening to a remote location such as a sewer drain or to the ground outside. Most commonly, the condensate pan is fabricated of a metal material such as steel which, because of the environment, must be painted or coated to prevent rusting. The potential rust problem can be exacerbated by the need for a threaded opening in the pan for connecting to a condensate drainage pipe.

In overcoming the rust problem, it has become desirable to use a moldable plastic material for the condensate pan. In addition to the advantage of being rustproof, the plastic material is characteristically more adaptable to forming in the desired shape to accommodate the particular coil and air flow such that there is relatively little air circulating through the tray to cause a flashing out of the water. In the prior art metal condensate pans, it has sometimes been necessary to provide baffles to prevent such an occurrence.

In certain air conditioning installations, it is required that the condensate pan be connected to a steel pipe to accommodate drainage from the system. This is true, for example, for furnace coils, where the system is installed in a somewhat remote part of the house such as the garage, the basement, a closet, the attic or the like. Typically, this part of the installation is made by a plumber who screws a three quarter inch steel pipe into a female threaded opening in the condensate pan. Since it is a plumbing connection, a standard pipe thread connection (i.e. National Pipe Thread) is normally required by the applicable code. Such a pipe thread is characteristically tapered such that a wedging relationship occurs as the male pipe is screwed into the female opening. Where a steel pipe is screwed into a steel opening, this wedging action occurs until a high torque condition indicates that a secure connection has been made. However, if a steel pipe is screwed into a plastic female coupling, the high torque condition, which the installer has come to expect, does not occur. Rather, the installer is likely to continue screwing in the steel pipe until finally the plastic female coupling breaks.

Another problem with the use of plastic at the connection point is that it is susceptible to corrosive sealers, lubricants and the like. For example, if, as is commonly done, a sealant is placed at the interconnection between the male threads of the steel pipe and a female threads of the female coupling, it may well react with the plastic material and cause damage to the connection.

It is therefore an object of the present invention to facilitate the use of a plastic material for a condensate pan in an air conditioning system.

Another object of the present invention is the provision for connecting a steel pipe to a plastic condensate pan without attendant problems.

Yet another object of the present invention is the provision for protecting a female coupling of a plastic condensate pan from an over-torqued condition when a steel pipe is installed therein.

Still another object of the present invention is the provision for protecting a female coupling of a plastic condensate pan from corrosive materials that may be used when installing a steel pipe therein.

Still another object of the present invention is the provision for an air conditioner condensate pan which is economical to manufacture and extremely functional in use.

These objects and other features and advantages become more readily apparent on reference to the following description when taken in conjunction with the appended drawings.

SUMMARY OF THE INVENTION

Briefly, in accordance with one aspect of the invention, a metal female coupling is inserted in an opening from the condensate pan, and is secured in such a way that when a steel pipe is threadably engaged with the insert, a normal high torque condition can be established between the steel pipe and the insert, while the integrity of the insert and condensate pan is maintained. In this way, the advantages of a plastic condensate pan are obtained while at the same time offering a more common and trouble free metal-to-metal connection between a steel drainage pipe and the condensate pan discharge opening.

In accordance with another aspect of the invention, the metal insert is secured within the condensate pan discharge opening by first knurling the outer periphery of the metal insert and then molding, during the process of molding the condensate pan itself, the condensate pan discharge opening around the metal insert. The result is that the insert is tightly secured within the condensate pan such that the interconnection can withstand a relatively high torque condition without affecting the integrity of the connection.

In accordance with other aspects of the invention, the metal insert is composed of a brass material so as not to be susceptible to rust or other chemical reactions, while at the same time being relatively inexpensive. Further, the insert is molded in the lower portion of the condensate pan in such a way that the lower wall of the discharge opening is at the same vertical level as the bottom of the condensate pan.

The drawings as hereinafter described, a preferred embodiment is depicted; however, various other modifications and alternate constructions can be made thereto without departing from the true spirit and scope of the invention.

BRIEF DESCRIPTION OF THE DRAWINGS

Referring now to FIG. 1, the invention is shown generally at 10 as applied to a condensate pan 11 in which an A-coil 12 is disposed. The A-coil 12 is typically located in a cabinet which is connected to a furnace in such a way as to allow the circulating air to be forced through the A-coil to be cooled in the heat transfer relationship. The A-coil 12 contains refrigerant tubing (not shown) which is connected to an outdoor coil and compressor to form a typical refrigeration/heat pump circuit. The A-coil 12 then acts as a condenser when the system is operating in the heating mode and as an evaporator when it is operating in the cooling mode. When acting as an evaporator, the A-coil 12 tends to have condensate formed on the outer surface thereof. The condensate pan 11 is thus provided to collect this condensate and carry it away by way of the drain connection 13 and its threadably connected steel pipe 14.

It will be recognized that, while the present invention is being shown and described in combination with an A-coil, it is applicable to any other type of air conditioning system where a condensate pan 11 is used.

Figure 1:
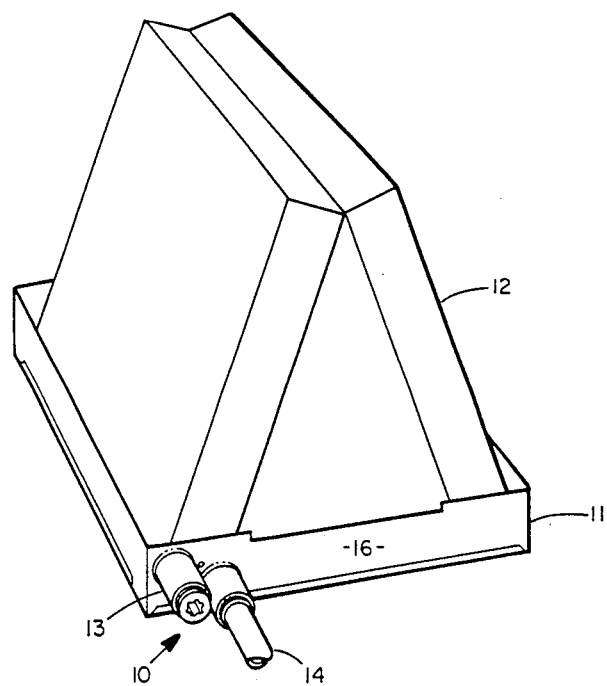
FIG. 1 is a perspective view of the inventive concept as applied to a condensate pan shown in combination with an A-coil.

The condensate pan 11 is molded in a single piece of high impact plastic and has a bottom and four upstanding sides. Formed integrally with and projecting from the front side 16 is the drain connection 13. The drain connection 13 comprises a pair of cylindrically shaped extensions 17 and 18 as shown in detail in FIGS. 2 and 3. The lower extension 17 is the primary conduit for conducting the flow of condensate from the condensate pan 11, whereas the upper extension 18 is provided as a secondary drain should the primary extension 17 become plugged. Thus, the primary extension 17 is connected to a steel drain pipe 14 as shown in FIG. 1. The upper extension 18 may similarly be connected to a secondary drain pipe or, if the installer chooses not to use it, may simply contain a plug 19 as shown. Thus, although only the lower extension 17 will be further described, it will be understood that the upper extension 18 is formed in substantially the same manner and structure.

Figure 2:
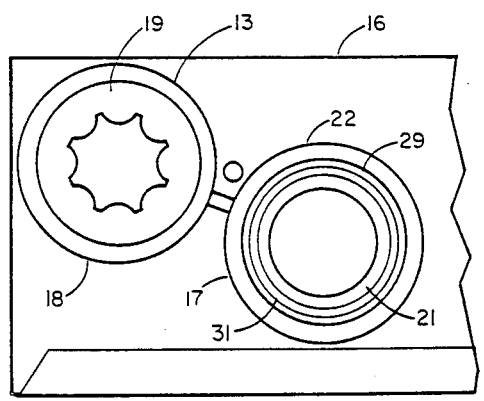
FIG. 2 is an end view of the inventive insert as applied to the drain connection.
Figure 3:
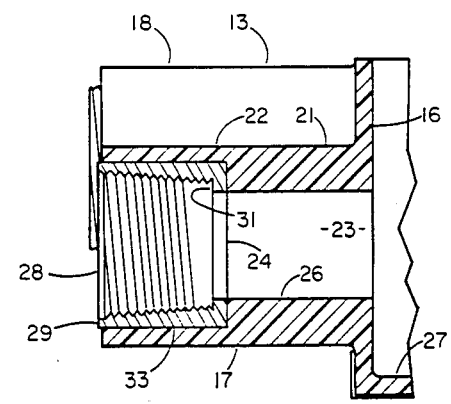
FIG. 3 is a side sectional view thereof.

Referring now to FIGS. 2 and 3, the lower extension 17 is formed of a base portion 21 and an end portion 22, with the base portion 21 defining the internal opening 23 and the end portion 22 defining an expanded internal opening 24. As will be seen in FIG. 3, the lower wall surface 26 of the base portion 21 is on the same vertical level and forms an extension of the bottom wall 27 of the pan. This feature provides for more complete drainage with no edges or indentions that might otherwise restrict the free flow of condensate.

Installed in the expanded internal opening 24 is a metal insert 28 having a cylindrical wall 29 closely surrounded by the extension end portion 22, and a radially extending sealing portion 31 which closely abuts the end of the extension base portion 21.

The insert 28 is preferably formed of a brass material and has tapered female threads 32 for threadably receiving the steel drainage pipe 14. The outer surface 33 of the insert 28 is knurled to provide a rough surface for engaging the inner surface of the surrounding end portion 22. For this purpose, a diamond knurl with a depth of 0.006 inches has been found to be satisfactory.

After the insert 28 is formed as described hereinabove, it is precisely placed in a mold and the condensate pan 11 is molded as a single piece with the extension 17 being molded around the insert 28 such that an interference fit of 0.020-0.030 inches exists between the insert outer surface 33 and the inner surface of the end portion 22. With such a structure, it has been found that when the steel pipe 14 is threadably engaged to the insert 28, the combination can withstand torques up to 90 foot pounds without destroying the integrity of the bond. In this way, the drain connection 13 is protected from lubricants and sealants that may be applied to the steel pipe 14, and further, it will be protected from overtorquing by the installer of the steel drainage pipe 14.

It will be understood that the present invention has been described in terms of a preferred embodiment but may take on any number of other forms while remaining within the scope and intent of the invention.

What is claimed is:

1. In a plastic condensate collection pan for use with an air conditioning system of the type having an evaporator coil which tends to form condensation on its outer surface, a discharge conduit and an associated coupling device for threadably connecting to a drainage pipe comprising:
   a plastic cylindrical conduit extending from a wall of the condensate pan and defining an axial opening therefrom;
   a cylindrical metal insert disposed in said axial opening and secured to said discharge conduit to prevent rotation of said insert when a torque is applied about its axes; and
   said insert having a threaded portion to which a discharge pipe can be connected.

2. A condensation collection pan as set forth in claim 1 wherein said insert is molded within said cylindrical conduit, with the inner surface of said conduit closely surrounding the outer wall of said insert.

3. A condensation collection pan as set forth in claim 2 wherein said outer surface of said insert is knurled to provide a plurality of generally radially extending grooves into which the plastic material of said conduit inner surface may extend.

4. A condensation collection pan as set forth in claim 1 wherein said insert has female threads for receiving male threads of a drainage pipe.

5. A condensation collection pan as set forth in claim 1 wherein said insert is composed of a brass material.

6. A plastic condensate pan for an air conditioning system of the type having a coil on whose outer surface condensate tends to form and drop to the pan below, comprising:
   a bottom and side walls defining a container;
   an opening in one of said side walls for conducting the flow of condensate therethrough;
   a collar formed integrally with, and forming a substantially perpendicular extension of, said one side wall and of said opening; and
   an insert located within said collar and having a cylindrical bore coaxially aligned with said opening, said bore having internal threads for receiving a threaded pipe therein, said insert being secured to said collar so as to substantially prevent its rotation therein when the pipe is threadably engaged with said insert.

7. A condensate pan as set forth in claim 1 wherein said collar is molded around the periphery of said insert.

8. A condensate pan as set forth in claim 7 wherein said insert has a knurled periphery.

9. A condensate pan as set forth in claim 6 wherein said insert is comprised of brass.

10. A method of fabricating a discharge conduit in a plastic condensate pan of the type used to collect and dispose of condensate that forms on the outer surface of an air conditioning evaporator coil comprising the steps of:
   (a) fabricating a metal cylindrical coupling;
   (b) forming internal threads therein;
   (c) knurling the external surface of said cylindrical coupling; and
   (d) while molding the plastic condensate pan, molding an integral cylindrical conduit around the knurled surface of said cylindrical coupling.

* * * * *